(12) United States Patent
Mougin et al.

(10) Patent No.: US 8,464,501 B2
(45) Date of Patent: Jun. 18, 2013

(54) METHOD AND INSTALLATION FOR GROUPING OF STACKABLE PRODUCTS OF THE CASES AND OTHER TYPE

(75) Inventors: Didier Mougin, Octeville-sur-Mer (FR); Michel Begin, Octeville-sur-Mer (FR); Guillaume Duchemin, Octeville-sur-Mer (FR); Christophe Poupon, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 0 days.

(21) Appl. No.: 12/652,312

(22) Filed: Jan. 5, 2010

(65) Prior Publication Data

US 2010/0269456 A1    Oct. 28, 2010

(30) Foreign Application Priority Data

Jan. 6, 2009    (FR) ...................................... 09 50048

(51) Int. Cl.
*B65B 35/50* (2006.01)
(52) U.S. Cl.
USPC .................................. 53/447; 53/443; 53/152
(58) Field of Classification Search
USPC ............ 53/152, 153, 443, 447, 540; 198/431, 198/435, 461.2; 414/792.7, 793.4, 794, 794.2
See application file for complete search history.

(56) References Cited

U.S. PATENT DOCUMENTS

| 2,324,930 | A |   | 7/1943 | Joa |
| 2,831,585 | A |   | 4/1958 | Patrick et al. |
| 3,250,376 | A |   | 5/1966 | Griner et al. |
| 3,526,170 | A | * | 9/1970 | Wiseman et al. ......... 414/790.4 |
| 4,399,905 | A | * | 8/1983 | Lance et al. ................... 198/430 |
| 4,534,695 | A | * | 8/1985 | Stump et al. ................... 219/386 |
| 4,577,453 | A | * | 3/1986 | Hofeler ............................. 53/438 |
| 6,349,815 | B1 | * | 2/2002 | Shaffer ....................... 198/418.4 |
| 6,984,098 | B2 | * | 1/2006 | Tsukahara et al. .......... 414/794.2 |

FOREIGN PATENT DOCUMENTS

| DE | 1 264 316 B |   | 3/1968 |
| EP | 0 354 469 A2 |   | 2/1990 |
| EP | 354469 A2 | * | 2/1990 |
| GB | 1075830 |   | 7/1967 |
| GB | 2237271 A | * | 5/1991 |

OTHER PUBLICATIONS

European Search Report for EP 10 15 0076, dated Jun. 23, 2010.

* cited by examiner

*Primary Examiner* — M. Alexandra Elve
*Assistant Examiner* — Eyamindae Jallow
(74) *Attorney, Agent, or Firm* — Sughrue Mion, PLLC (57) ABSTRACT

The method for grouping stackable products arriving in line on a feed conveyor which has an accumulation function and a distribution function of the products, distribution being carried out sequentially to feed a supply conveyor which makes the products available so that they can be collected, the method including collecting the products distributed on the supply conveyor by a transversal collector which is mobile in a vertical plane, depositing the collected products on a take-up station which is located above the level of the supply conveyor and providing the collector with a loop movement, cyclical, in order to collect the products, deposit them and return to the point of departure.

16 Claims, 10 Drawing Sheets

METHOD AND INSTALLATION FOR GROUPING OF STACKABLE PRODUCTS OF THE CASES AND OTHER TYPE

FIELD OF THE INVENTION

This invention relates to a method for grouping stackable products having a parallelepiped form, such as cases, small plates or other, in order to pack them in a case, for example; it also relates to the installation which makes it possible to implement this method.

DESCRIPTION OF THE PRIOR ART

A method and an installation for stacking parallelepiped products are in particular described in EP 354469. The products arrive on a supply conveyor which makes said products available to a collecting system with separate plates forming a sort of noria, plates being mobile, after the collecting of a product, longitudinally in the same direction as that of said products as well as vertically, upwards.

Additional means of collecting make it possible to remove each product in relation to its plate and to have it taken up by a conveyor which sees the stack forming as said products are collected. The products are deposited one on top of the other, forming a batch which is removed by the take-up conveyor.

SUMMARY OF THE INVENTION

The invention proposes a method for grouping these products in order to form a batch so that it can be packaged in a box, and this method can be implemented in an installation that is compact, relatively simple and above all provided with substantial capacities in terms of versatility and flexibility.

In fact, this method and the installation for its implementation, make it possible to consider the use of a tool of great simplicity, that is easy to change and above all of an extremely modest cost, which makes it possible to carry out, without constraints, tools that are well adapted to each type of product to be grouped together.

In addition this method makes it possible to shorten, in terms of the installation, the length of the circuit followed by the products and as such to reduce the risks of alteration of the latter due to friction, in particular, on guides and other.

The installation is positioned directly as the output of the product preparation unit. It can also be a genuine accessory and be used only for specific work, for certain types of products; the rest of the time it can be deactivated, shunted.

The method for grouping according to the invention makes it possible to form a batch of stackable products of the cases, small plates or other type, so that they can be taken up by appropriate means in order to carry out the packing of them, products arriving in line on a first feed conveyor which has an accumulation function and a distribution function of said products, distribution being carried out sequentially in order to feed a supply conveyor which makes said products available so that they can be collected, method consisting in:

collecting the products distributed on said supply conveyor by means of a device for collecting in the form of a comb with superimposed cells, called a collector in the rest of the text, collector being arranged transversally in relation to the longitudinal direction of advancement of said products on said supply conveyor, and it is mobile in a vertical plane, in depositing the products, which have just been collected, on a take-up station which is located above the level of the supply conveyor, in providing said collector with a loop movement, cyclical, which comprises several phases: a collecting phase, a depositing phase and a return phase, said collecting phase that can be divided into a vertical rising movement and a longitudinal movement for advancing opposite to the direction of advancement of said supply conveyor and said return phase that can be divided into a longitudinal movement in the direction of advancement of said supply conveyor and a vertical descending movement, in triggering the collecting phase of the products by taking into account information such as the position of said products on said supply conveyor in relation to said collector and, according to the case, the speed of said supply conveyor, in organising the depositing phase by an operation of emptying of all of the products forming the batch which is located in the collector and by a simultaneous operation of transferring this emptying on a receiving slider bed where said batch takes the form of a stack of products.

According to a first embodiment, the method consists in furnishing the supply conveyor then in stopping it for at least the time for collecting of all or a portion of the quantity of products that it is carrying.

According to another embodiment the method consists in collecting the products on the fly on the supply conveyor which is continuously over-supplied by the feed conveyor and which itself advances continuously with the products to be collected.

According to the first embodiment of the invention, the method for grouping products consists in: —detecting the presence of a product upstream of the collector, —in stopping the supply conveyor as soon as the first product has been collected by the collector, —in displacing the collector vertically and then longitudinally in order to carry out the collecting of the following products and, after the collecting of the last product arranged upstream of said supply conveyor, —in bringing said collector downstream of the supply conveyor, —in obstructing its travel by means of a structure which directly takes up the collected products (said products passing by the take-up station, which constitutes an obstruction on the return path of the collector), collected products being stacked on the slider bed of said take-up station, retained by an obstruction in the form of a backrest associated to said slider bed, and simultaneously to the return movement of said collector, in putting the supply conveyor back into movement in order to load it again with the products to be collected.

According to the second embodiment which consists in collecting the products on the fly on a supply conveyor which advances continuously with the products, the method consists, after the last collecting, in vertically and then horizontally displacing the collector in order to supply its collecting on the take-up station, then in supplying an obstruction on the return path of said collector in association with said take-up station and in setting said collector into return movement in the direction of advancement of the supply conveyor, movement provoking an automatic emptying of said collector, and in providing said collector with a return movement at a speed that is greater than that of said supply conveyor in order to go back up the queue of products to be collected arranged on the latter and return to its departure position of collecting said products.

According to an alternative of this second embodiment, after the collecting of products and the vertical displacement of the collector in order to not obstruct the passing of the products which are arranged on the supply conveyor, the method consisting in supplying said collector between a take-up station arranged laterally and a structure for emptying in the form of a comb complementary to said collector, in providing said structure for emptying with a transversal movement, in relation to the longitudinal movement of the collector, and during the stoppage of the latter, in transferring the collected products towards said take-up station and in putting said collector back in its point of departure.

The invention also relates to the installation which allows for the implementation of the method detailed hereinabove, installation comprising:
- a feed conveyor acting as an accumulation and distribution conveyor for the products to be grouped together,
- a supply conveyor which is furnished by said feed conveyor, supply conveyor being capable of a speed for advancement which is greater than that of said feed conveyor in order to generate, automatically, a space between the products,
- a device for collecting, or collector, in the form of a comb arranged transversally in relation to supply conveyor and mobile in a vertical plane, collector comprising superimposed cells arranged to collect the products one after the other,
- a take-up station arranged at a level which is greater than that of the plane of the product supply conveyor, and, associated to this take-up station, means of unloading said collector in order to deposit said products collected on the slider bed of the take-up station, in the form of a stack.

According to a first embodiment, the take-up station for the products is located on the return path of the collector and the means of unloading of said collector are comprised of a backrest, backrest obstructing the travel of the products during said return movement of the collector, products being deposited automatically on the slider bed of the take-up station, in the form of a stack of products.

Still according to this first embodiment, the collector is comprised of a comb that circulates between two product supply conveyors, collector collecting the products in their central middle portion and depositing these products at the take-up station which is comprised of two slider beds arranged each respectively above said supply conveyors, products resting, by their ends, on each slider bed.

The unloading of the collector is carried out, on the take-up station, by means of a pair of backrests that obstruct the passing of the products during the return movement of said collector, collector passing between two backrests and between the two slider beds, leaving the products on said take-up station, in the form of a stack able to be picked up by appropriate means of the robot or other type.

According to another embodiment the products are arranged crosswise on a single supply conveyor and the collector is comprised of two combs arranged on either side of this supply conveyor, in order to collect the products on their ends; said products being transported by means of the supply conveyor on their central middle portion.

According to a first embodiment of the invention, in the case of a collector comprising two combs which frame the product supply conveyor, the take-up station comprises a slider bed arranged above the level of the products located on the supply conveyor, on the return path of said collector, take-up station comprising a slider bed arranged above and in the alignment of the product supply conveyor and means of unloading of said collector comprised of a backrest associated to said slider bed, backrest obstructing the passing of the products, on the return path of the collector, products being deposited on their central portion, on said slider bed, in the form of a stack.

According to another embodiment of the invention, in the case of a collector comprising two combs arranged on either side of the supply conveyor, said combs are carried by branches which are spaced by a distance that is greater than the dimension of the products, in their transversal direction, such as they are carried, said products, by the supply conveyor.

Still according to the invention, in the case of this collector of which the two combs are carried by branches spaces by a distance that is greater than the transversal dimension of the products, the take-up station is arranged on the upstream portion of the supply conveyor, in order receive the collected products before the return movement of said collector towards the point of departure.

According to a first embodiment, the take-up station comprises a slider bed arranged above the supply conveyor and means of unloading comprised of a removable pallet which constitutes an obstruction for the products on the return path of said collector, pallet being mobile in a vertical plane between an inactive position which allows for the passing of the products during the movement of going back up the queue, until the take-up station, and an active position wherein the pallet is positioned between the two combs, across from the central portion of the products in order to unload said collector.

According to another embodiment, the take-up station is arranged in the upstream portion of the supply conveyor, shifted laterally in relation to the path of the collector and this take-up station interacts with means of unloading of said collector which are comprised of a device in the form of a comb, complementary to the combs of said collector, device provided with a transversal movement in relation to the movement of said collector in order to transfer the products arranged in the cells of the collector on the slider bed of the take-up station which is arranged laterally, making possible a return to the point of departure, of the collector, as soon as the products carried by the latter are ejected.

BRIEF DESCRIPTION OF THE DRAWINGS

But the invention shall be further detailed using the following description and the annexed drawings, provided for the purposes of information, and wherein.

DETAILED DESCRIPTION OF THE INVENTION

Figure 1:
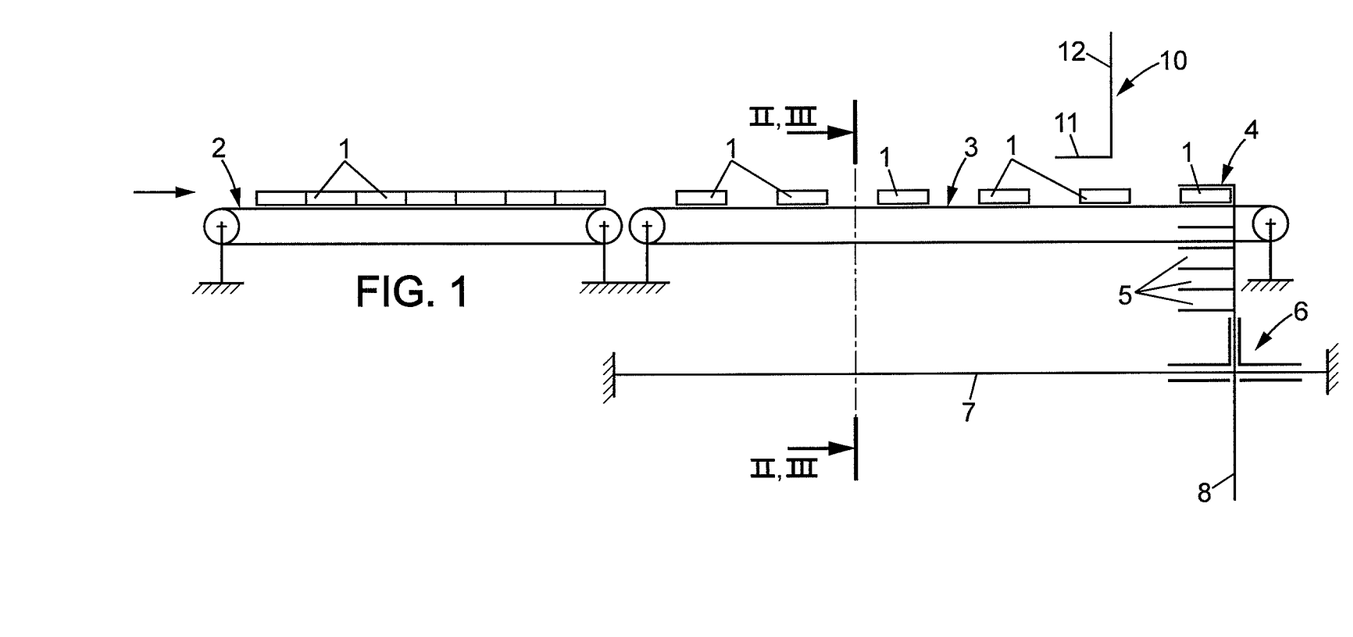
FIG. 1 is a diagrammatical elevational view of the installation according to a first embodiment wherein the collecting of products is carried out with a stoppage of the supply conveyor.

FIG. 1 shows, diagrammatically and as an elevational view, the main elements that comprise the implementation of the method of grouping products and, in particular, products 1 which have the form of an extended rectangle parallelepiped as, for example, cases, small plates or other, products 1 having, in particular, the particularity of being able to be stacked.

The installation comprises a first conveyor 2, of the endless belt type, which receives the products 1 coming from a preparation machine not shown. This first conveyor 2, called feed conveyor in the rest of the text, is followed by a conveyor 3 of the endless belt type also, conveyor 3 will be called supply conveyor 3 in the rest of the text.

The feed conveyor 1 has a dual function: an accumulation function of the products 1 and a distribution function of these same products 1 to the supply conveyor 3. This supply conveyor 3 moves at a speed which is greater than that of the feed conveyor 2 which makes it possible, by an appropriate control of the speeds of each one, to obtain a spacing of the products 1 which follow each other on said supply conveyor 3.

The products 1 which are arranged on the supply conveyor 3 are intended to be collected by a device for collecting, in the form of a comb, called, in the rest of the text, a collector 4. This collector 4 is arranged transversally in relation to the longitudinal direction of advancement of the products 1 which are on the supply conveyor 3 and it is mobile in a vertical longitudinal plane, i.e. a plane which is perpendicular to the conveying plane of said products 1.

This collector 4 comprises several cells 5 arranged to collect the products 1 which are distributed on the supply conveyor 3. These cells 5 are open towards the upstream of the supply conveyor 3; they are superimposed and their number is adapted to the stack of products 1 which constitutes a batch. The form and the dimensions of the cells 5 are adapted to those of the products 1 to be collected and in particular to the section of these products 1.

The collector 4 interacts with a system 6 of slide rails which is located under the supply conveyor 3; this system 6 of slide rails makes it possible to carry out the guiding of said collector 4 in the longitudinal plane and in the vertical plane of the installation.

The means for guiding of the collector in the longitudinal plane are, for example, in the form of slide rails 7, slide rails being parallel to the plane and to the longitudinal axis of conveying of products 1. The means that provide the vertical guiding of the collector 4 are comprised of one or several arms 8, as detailed hereinbelow in liaison with the various FIGS. 2, 3, 9 and 13, arm(s) 8 acting as slide rails, for example.

Note, arranged above the supply conveyor 3, in its downstream portion, a take-up station 10 which comprises a slider bed 11 in parallel to the plane of conveying of the products 1 and a backrest 12, backrest being arranged at a right angle in relation to said slider bed 11; this backrest 12 constituting an obstruction for the products 1 which are in the cells 5 of the collector 4 during the return movement of the latter and this backrest 12 makes it possible to unload said products 1 and to deposit them on said slider bed 11 in the form of a stack.

Figure 2:
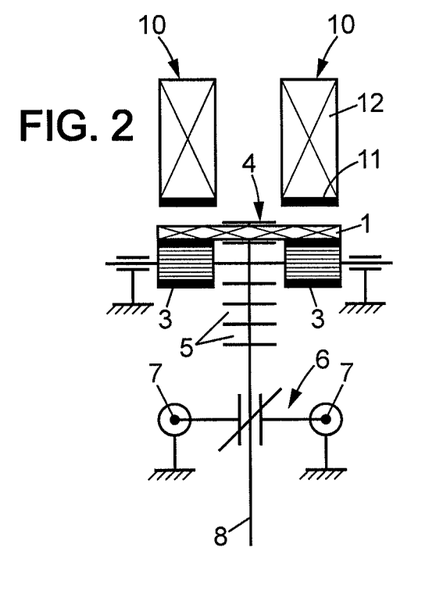
FIG. 2 is a view according to II-II in FIG. 1, showing a first embodiment of the installation, with a single collector arranged between two supply conveyors.

FIG. 2 shows, diagrammatically, a view according to II-II in FIG. 1, showing a possible embodiment of the collector 4 and of the supply conveyor 3 which makes the products 1 available to said collector 4.

The supply conveyor 3 is comprised of two conveyors 3 which are spaced transversally in order to allow for the passing of the collector 4 during its outward movement for the collecting of products arranged on said conveyor 3 and during its return movement during which it abandons the products at the take-up station 10.

The products 1 are carried and conveyed on their ends by the two supply conveyors 3. The sum of the widths of the collector 4 and of the two supply conveyors 3 corresponds substantially to the transversal dimension of the products 1 and, for example, to the width of the feed conveyor 2.

The collector 4 comprises, for example, a single arm 8 with a degree of freedom in the vertical direction and its width is between one-third and two-thirds of the transversal dimension of the products 1

Above both supply conveyors 3, are two take-up stations 10 for products 1; these two stations 10 are separated by a distance which is substantially greater than the width of the collector 4, and they are located above, respectively, the supply conveyors 3.

Figure 3:
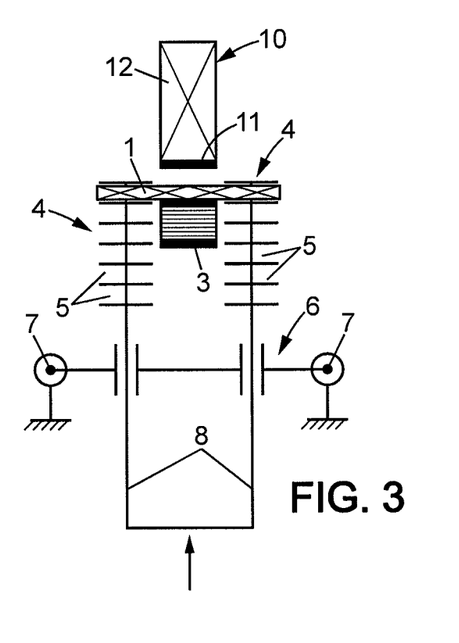
FIG. 3 is a view according to III-III in FIG. 1 showing an alternative embodiment, wherein the collector is comprised of two combs which frame a single supply conveyor.

FIG. 3 shows an alternative embodiment of the installation wherein the products 1 are presented to the collector 4 by means of a single supply conveyor 3 which is located in the middle longitudinal extension of the feed conveyor 2.

The supply conveyor 3 carries the products 1 on their median portion; said products 1 are placed crosswise on the endless belt of said conveyor 3. The width of this supply conveyor 3 is, for example, between one-third and two-thirds of the transversal dimension of products 1.

In this configuration, the collector 4 is comprised of two portions which are arranged on either side of the conveyor 3 for making available. Each collector 4 interacts, by means of its cells 5, with the ends of the products 1 and, in this configuration, note that the two arms 8 of the collector 4 are separated by a distance which is less than the transversal dimension of the products 1.

Note also, the presence of the take-up station 10 for products 1, station 10 being arranged above the conveyor 3 for making available, and its width is less than the space that is present between the two collectors 4.

Also, still on this FIG. 3, is found the guiding system 6 which comprises the horizontal slide rails 7 and two vertical slide rails which correspond to the two arms 8 of the collector 4.

FIGS. 4 to 7 show the sequencing of the operations which make it possible to carry out a grouping of the products 1 and to deposit them on take-up station 10.

Figure 4:
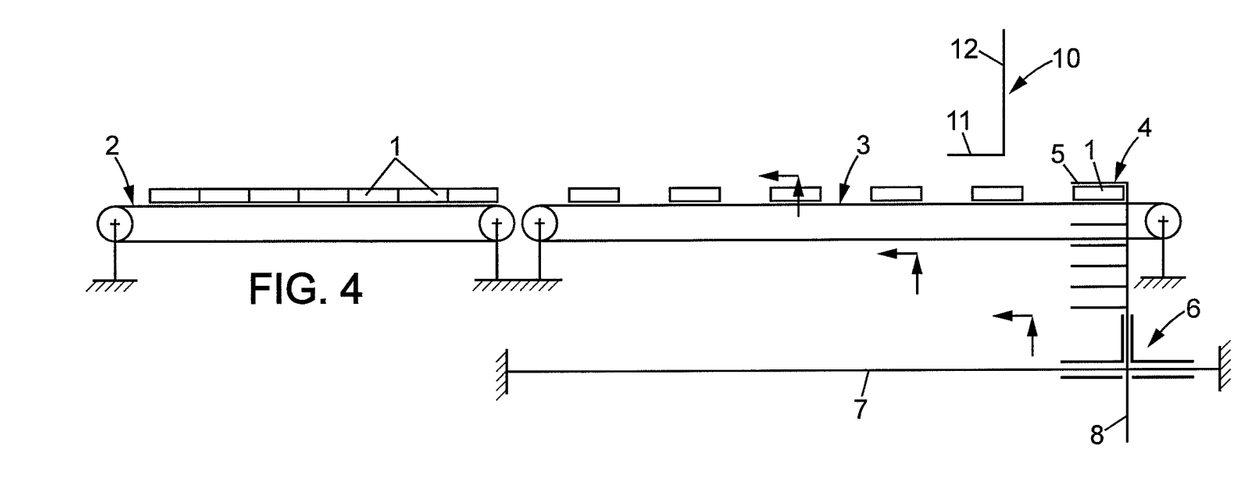
FIG. 4 shows the operation of collecting of products on the supply conveyor, supply conveyor being stopped during said collecting.

In FIG. 4, is shown the collector 4 of which the upper cell 5 is already loaded with a product 1 which was brought by the conveyor 3 for making available. As soon as the first product 1 is engaged in the cell 5 of the collector 4, the conveyor 3 for making available stops and said collector 4 is shifted vertically and horizontally in order to collect the following product 1 which is upstream; it is shifted vertically by the height of a cell 5 and horizontally by a distance which corresponds to the space between two products 1 on the endless belt of said supply conveyor 3, and continues until the last product 1 located upstream of said conveyor.

Note the position of the take-up station 10 which is located towards the downstream portion of the supply conveyor 3 in order to allow for the passing of products 1 under its slider bed 11 at the beginning of the outward movement of the collector 4, i.e. at the beginning of the collecting of products 1 arranged on said conveyor 3.

Figure 5:
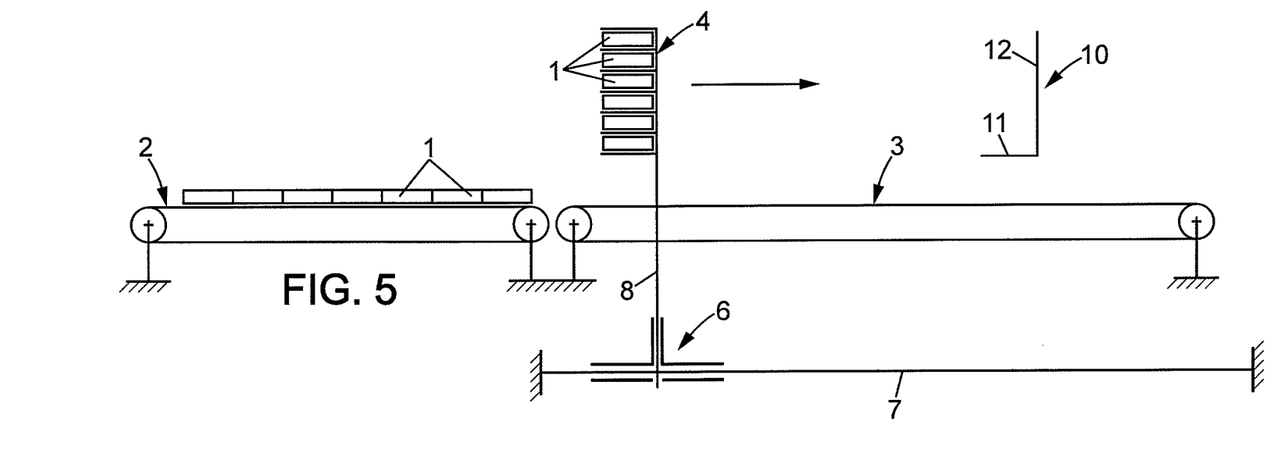
FIG. 5 shows the collector after the collecting of all of the products arranged on the supply conveyor, before the restarting of the latter.

FIG. 5 shows the collector 4 having completed its operation of collecting products 1. Arrived at the end of travel, this collector 4 returns backwards, i.e. towards the downstream of the conveyor 3 for making available, in order to drop the different products 1 on the take-up station 10.

Figure 6:
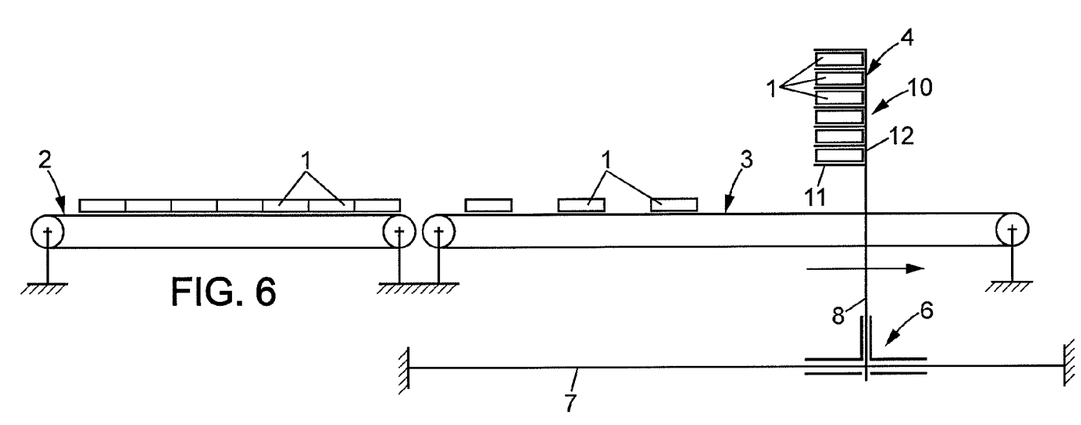
FIG. 6 shows the collector during its return movement, positioned on the take-up station, with the supply conveyor in movement, again carrying products to be collected.

FIG. 6 shows the collector 4 having reached the take-up station 10; the products 1 are stopped by the backrest 12 of the station 10 and, after the clearing of said collector 4, said products 1 rest on the slider bed 11 of said station 10 in the form of a stack of products.

Note also in this FIG. 6, the replenishment of the conveyor 3 of making available with the products 1, supply conveyor 3 having been restarted as soon as the return movement of the collector 4, at a speed that is less than that of the latter, by appropriate means of control, of the automaton type. This replenishment of the supply conveyor 3 is carried out by means of the feed conveyor 2 which distributes the products 1 at a certain speed, speed which is less than that of said supply conveyor 3, in order to automatically perform a regular spacing between the products 1 on said supply conveyor 3.

Figure 7:
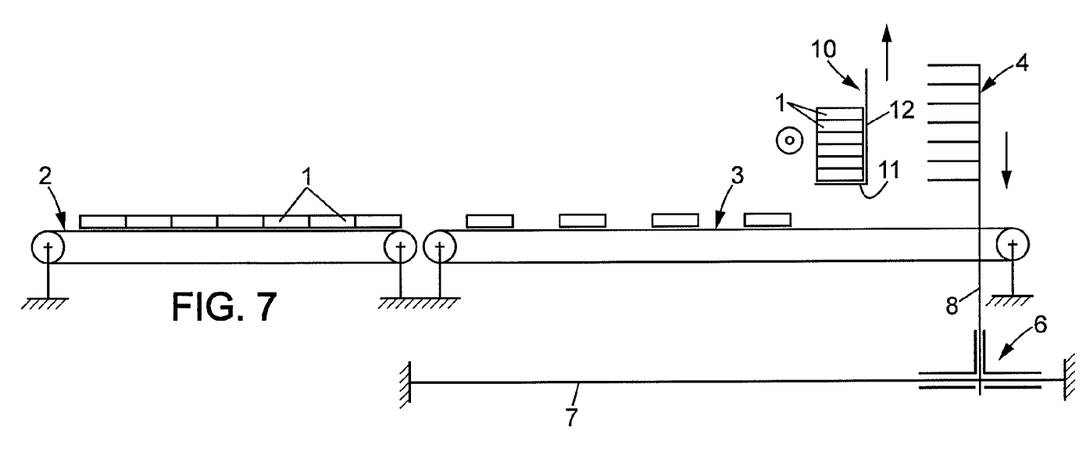
FIG. 7 shows the collector after the depositing of the collected products, on the take-up station, collector preparing to return to its point of departure for the collecting of products arranged on the supply conveyor, as shown in FIG. 1 and FIG. 4.

FIG. 7 shows the stack comprised of the batch of products 1; this stack is in place on the take-up station 10, waiting to be removed by additional means, not shown. This batch of stacked products 1 can be removed transversally by appropriate means of the pusher type, or be taken up by other means, such as a robot, in order to be transferred to a case packing station, for example.

Still in this FIG. 7, the collector 4 is empty and it has arrived at the downstream end of the supply conveyor 3. This conveyor 3 continues to be loaded with products 1 by the distribution conveyor 2 and, at the same time, the collector 4 is repositioned, as shown in FIG. 4, in order to receive, in due time, the first product 1 which is brought by said supply conveyor 3 and the cycle resumes as detailed hereinabove.

The method for grouping products 1 as such comprises several operations which are in sequence in order to carry out their packaging in the form of batches, products arriving in line on the feed conveyor 2 which has an accumulation function and a distribution function of said products, distribution being carried out sequentially in order to feed the supply conveyor 3 which makes said products available to a collector 4 so that they can be collected; in this first embodiment, the supply conveyor 3 is stopped during at least the collecting time of all or a portion of the quantity of products that it is carrying, and the method consists in:

collecting the products distributed on said supply conveyor 3 by means of a collector 4 which is arranged transversally in relation to the longitudinal direction of advancement of said products on said supply conveyor 3, and this collector 4 is mobile in a vertical plane, in depositing the products, which have just been collected, on take-up station 10 which is located above the level of said supply conveyor 3, in providing said collector 4 with a loop movement, cyclical, which comprises several phases: a collecting phase, a depositing phase and a return phase, said collecting phase that can be divided into a vertical rising movement and a longitudinal movement for advancing opposite to the direction of advancement of said supply conveyor 3 of products and said return phase that can be divided into a longitudinal movement in the direction of advancement of said supply conveyor 3 of products and a vertical descending movement, in triggering the collecting phase of the products by taking into account information such as the position of said products on said supply conveyor 3 in relation to said collector 4 and, according to the case, the speed of said supply conveyor 3, in organising the depositing phase by an operation of emptying of all of the products forming the batch which is located in the collector 4 and by a simultaneous operation of transferring this emptying on a receiving slider bed 11 where said batch takes the form of a stack of products, operation of emptying consisting in obstructing the travel of the products by means of a backrest 12 which allows for the depositing of said products on said slider bed 11, and, simultaneously to the return movement of said collector (4), in putting the supply conveyor (3) back into movement in order to load it again with the products to be collected.

Figure 8:
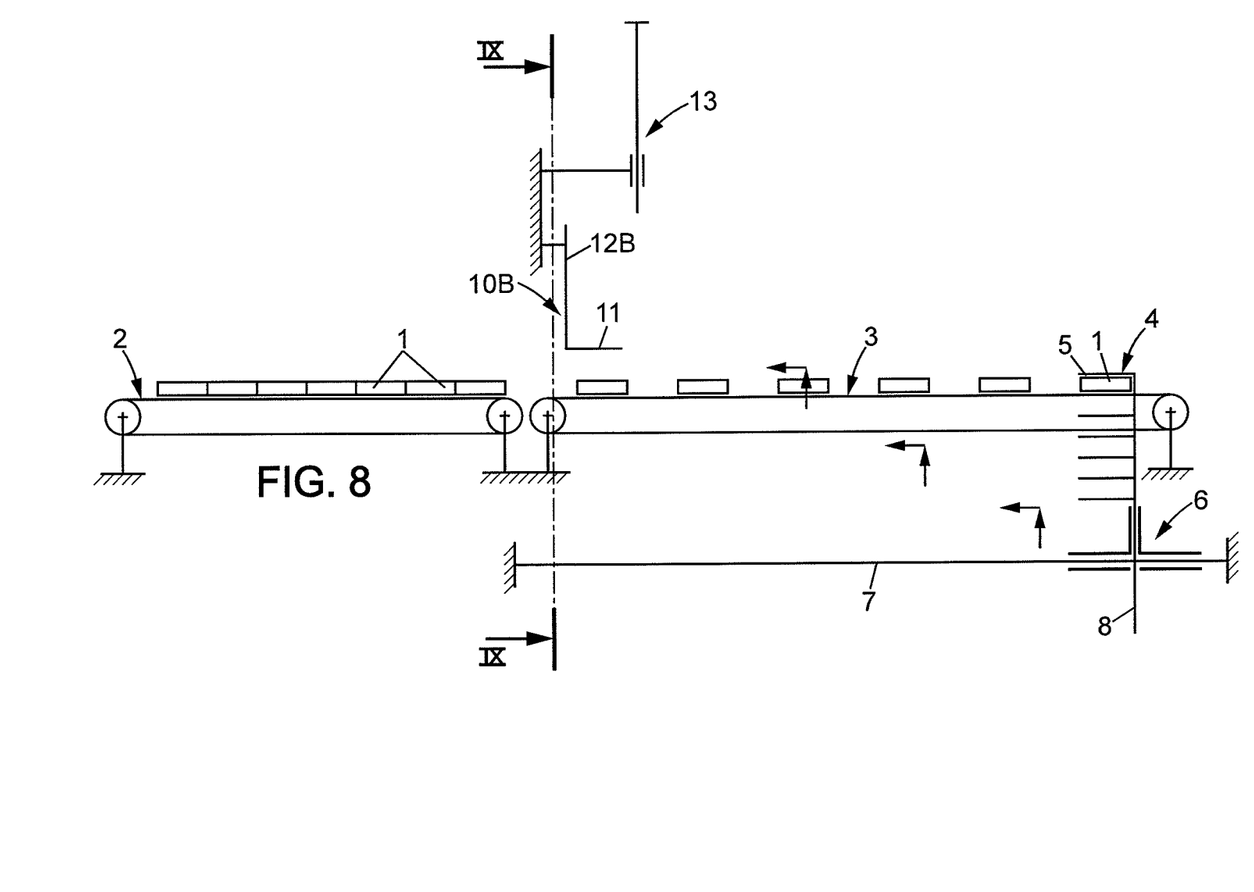
FIG. 8 is a diagrammatical elevational view of an alternative embodiment of the invention wherein the collecting of products is carried out on the fly, at the same time as the advancing of the product supply conveyor.

FIG. 8 shows an alternative embodiment of the installation which makes it possible to carry out the collecting of product 1, on the fly on the supply conveyor 3, without having to stop this conveyor during the operation of collecting said products 1.

The collector 4 and its guiding system 6 remain identical.

The alternative embodiment pertains to the take-up station 10 which is located on the upstream end of the supply conveyor 3, this take-up station 10B comprises a slider bed 11 which is arranged, as hereinabove, above the supply conveyor 3, in parallel with the circulation plane of the products 1. Upstream of this slider bed 11, note a wall 12B which acts as a guide for the wedging of the products 1 and in particular for the stacking of products 1 when the latter are deposited on the slider bed 11.

The collector 4 is positioned on take-up station 10B at the end of travel, when it has completed the collecting of the various products 1. In order to empty the cells 5 of the collector 4, the take-up station 10B comprises means which comprise an obstruction for the products 1 located in said collector 4 when this latter begins its return movement towards the downstream of the supply conveyor 3. The obstructing means are comprised of a pallet 13 which is mobile vertically, maneuvered by appropriate means, in order to be positioned behind the products 1 when the collector 4 is positioned on the take-up station 10B. This pallet 13 makes it possible to empty the cells 5 of the collector during the return movement of this collector 4, towards its position of departure.

Figure 9:
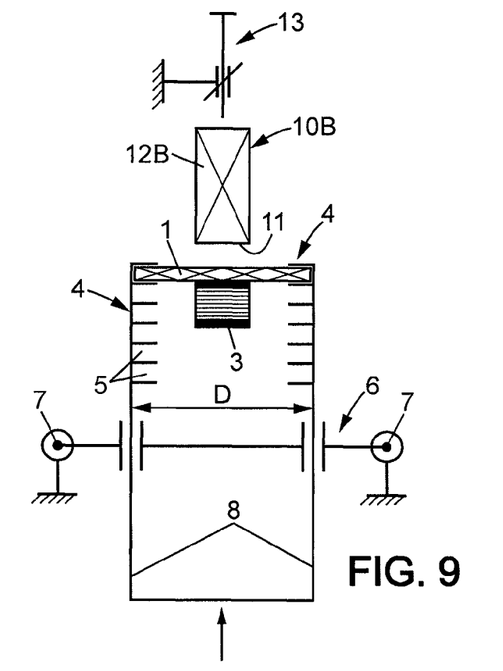
FIG. 9 is a view according to IX-IX in FIG. 8, showing a collector comprised of two combs which are carried by branches of which the spacing is greater than the transversal dimension of the products to be collected.

FIG. 9 is a view according to IX-IX in FIG. 8. In this embodiment, the products 1 are arranged transversally, on the supply conveyor 3 and this conveyor 3 is arranged between the two combs of the collector 4.

The distance D that separates the two arms 8 of the collector 4 is greater than the transversal dimension of the products 1. This space between the two arms 8 is sufficient in order to allow for the passing of said products 1, carried by the supply conveyor 3, when the collector 4 is located on the take-up station 10B, during the unloading phase.

This arrangement of the collector allows the supply conveyor 3 of the products to operate continuously and to be furnished with products 1 while said collector 4 prepares to unload the products 1 which are in the cells 5, on the take-up station 10B. The collector 4, as shown hereinbelow, is provided with a reverse movement in order to return to the point of departure of the collecting of products 1; during this return, said collector 4 is provided with an acceleration and with a speed that are appropriate for reaching the point of departure of the collecting before the arrival of the first product 1 which is brought by the conveyor 3.

Figure 10:
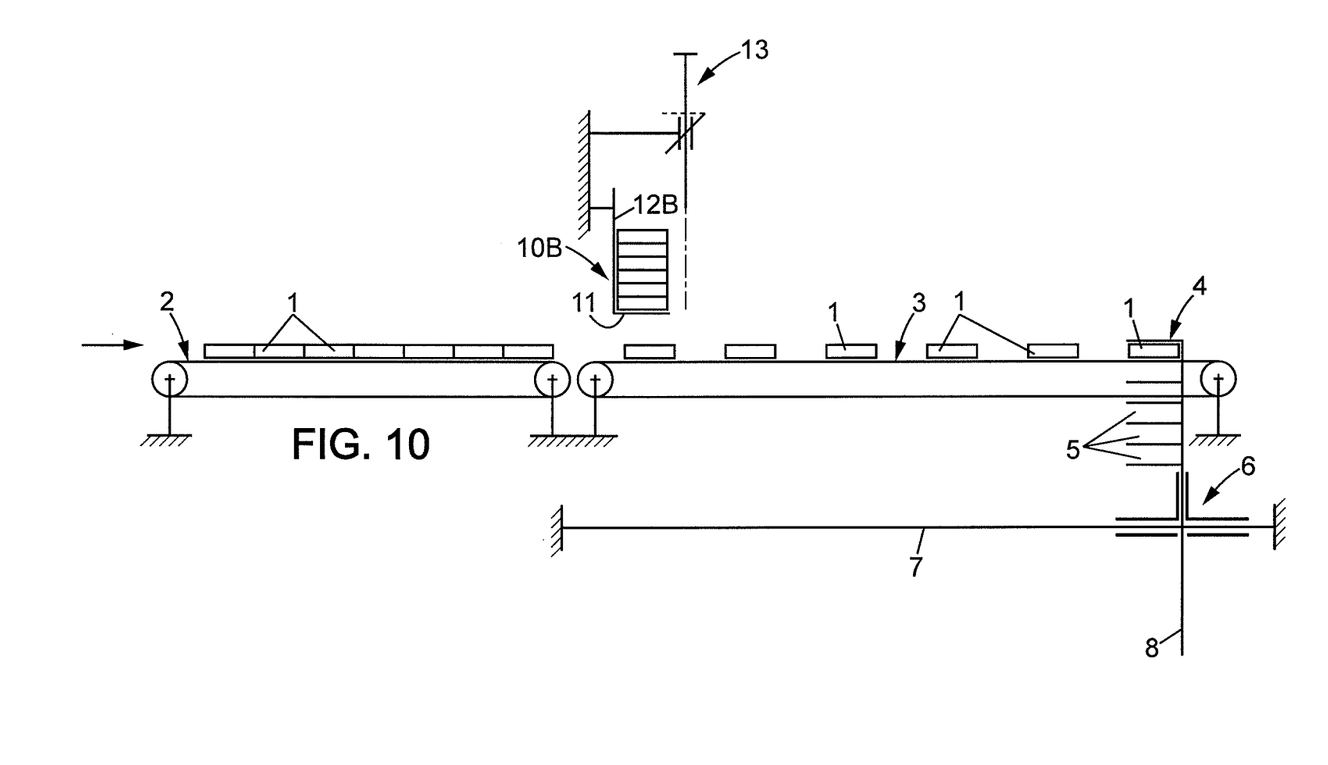
FIG. 10 shows a new operation of collecting products on the supply conveyor, after the depositing of the collected products beforehand on the take-up station where said products collected have the form of a stack ready to be removed by an additional device of the robot or other type.

FIG. 10 shows the collector 4 in a position of collecting of the first product 1 arranged on the supply conveyor 3. Starting from this position, the collector 4 is subjected to a movement of vertical displacement in order to present the opening of its cell 5 to the following product 1 and, it is provided with a longitudinal movement to go back up the queue of products 1 arranged on said supply conveyor 3.

In this FIG. 10, note the stack of products 1 which has just been deposited by the collector 4 on take-up station 10B. The pallet 13 is shown in retracted inactive position in solid dashes and it is also shown, in its active position of retaining products 1, in thin mixed dashes.

The products 3 which are arranged in the form of a stack on the take-up station 10 are taken again by appropriate means of the robot type, not shown. They can also be transferred laterally by means of a pusher, not shown, towards a case packing station or towards an additional station.

Figure 11:
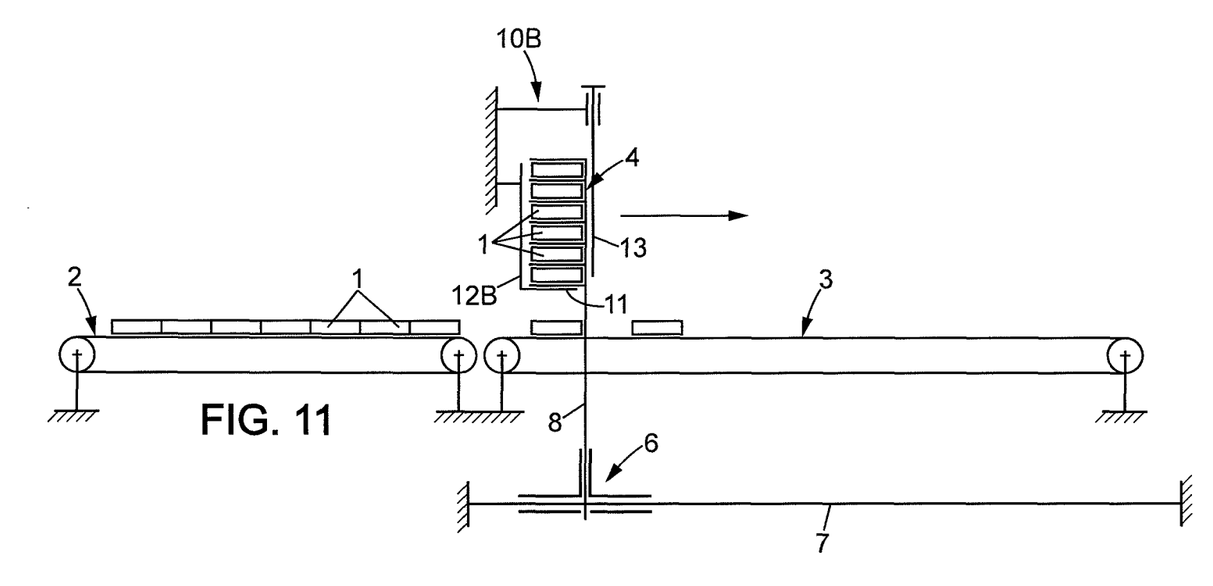
FIG. 11 shows the arrival of the collector with all of its collected products, on the take-up station, before it is unloaded by means of the pallet which obstructs the path of the products during the return movement of said collector, and on this figure, note also the loading of the supply conveyor during this operation of unloading of the collector.

FIG. 11 shows the collector 4 at end of travel, after having filled its different cells with products 1. At the end of travel, this collector 4 is positioned on take-up station 10B of the products 1. Note the putting into active position of the pallet 13, downstream of the collector 4. This pallet 13, which is located above the supply conveyor 3, is also located between the combs of the collector 4, which allows said collector 4 to carry out its return movement and, simultaneously, to abandon the different products 1 that accumulate, in the form of a stack, on the slider bed 11 on take-up station 10B.

Still on this FIG. 11, note that the supply conveyor 3 begins to be loaded with products 1 which are spaced, while the collector 4 is being unloaded of its batch of products 1 on take-up station 10B.

The collector 4 carried out a reverse movement in order to return to its point of origin for collecting products, as shown in FIG. 8, with a movement of which the acceleration and the speed are arranged in order to go back up the queue of products 1 which is already positioned on the supply conveyor 3 and is set back into active position for collecting these various products 1.

In this embodiment, the method for grouping products consists in collecting said products 1 on the fly on the supply conveyor 3 which is over-supplied continuously by the feed conveyor 2 and which itself advances continuously with the products to be collected.

The method also consists in: —detecting the presence of a product upstream of the collector 4, —in displacing the collector 4 vertically and then longitudinally in order to carry out the collecting of the following products and, after the collecting of the last product arranged upstream of said supply conveyor 3, —in displacing vertically and then horizontally said collector 4 in order to supply its collecting on take-up station 10B, then in supplying an obstruction in the form of a pallet 13 on the return path of said collector 4 and in putting said collector 4 in a return movement in the direction of advancement of said supply conveyor 3, movement provoking an automatic emptying of said collector 4, and in providing said collector 4 with a return movement at a speed that is greater than that of said supply conveyor 3 in order to go back up the queue of products to be collected arranged on the latter and return to its departure position of collecting said products.

Figure 12:
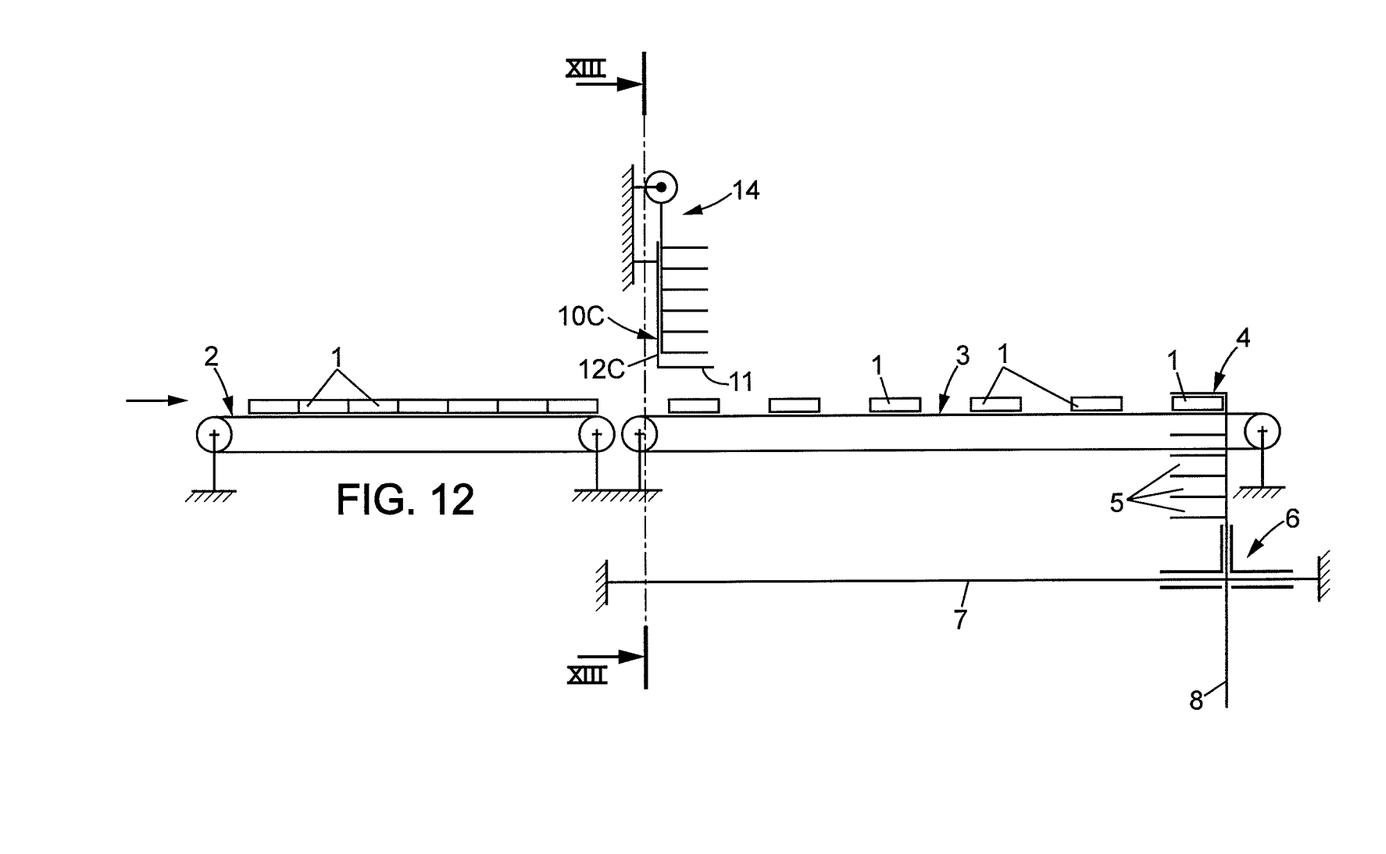
FIG. 12 is an alternative embodiment of FIG. 8, on the take-up station of products.

FIG. 12 shows an alternative embodiment of the installation.

Figure 13:
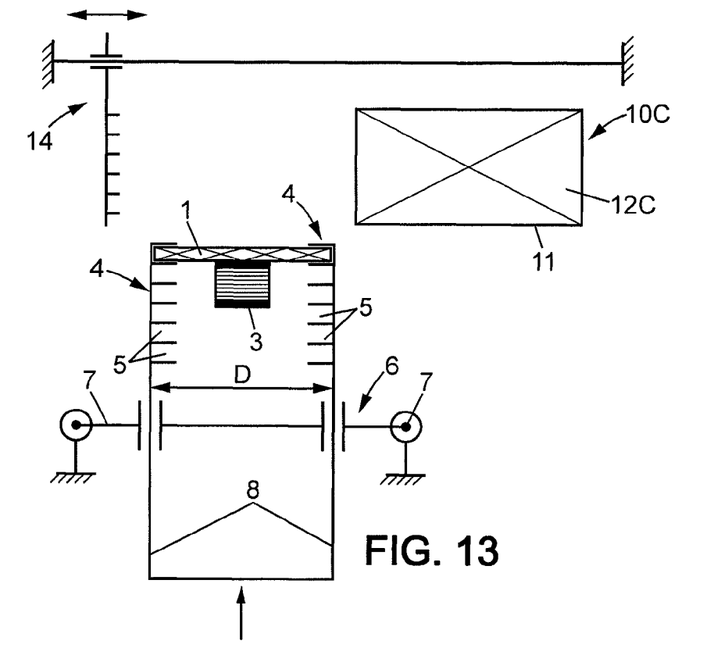
FIG. 13 is a view according to XIII-XIII in FIG. 12.

In this embodiment, the take-up station 10 which is located on the upstream portion of the supply conveyor 3. This take-up station 10C is arranged laterally, shifted in relation to the trajectory of the collector 4, as shown in FIG. 13. This take-up station 10C comprises, as hereinabove, a slider bed 11 which makes it possible to receive the products 1 in the form of a stack and it further comprises a wall 12C which acts as guide wall for the products 1 when they are deposited by the collector 4. This take-up station 10C can also have a U-shaped section and form a sort of gutter for the products 1, gutter able to have a length, in the transversal direction which makes it possible to house several batches of products one after the other and these batches are taken again, as hereinabove by appropriate means of the robot type, for example.

The products 1 are taken up by the collector 4, as detailed in liaison with FIG. 13, by the two lateral combs of said collector 4. These products 1 are taken up on their ends and the distance D between the arms 8 which carry the combs of the collector 4 is, also, greater than the transversal dimension of the products 1 in order to form a sort of window which allows these products 1 to continue to circulate, driven by the supply conveyor 3, during the unloading phase of the products 1 on the take-up station 10C.

In order to unload the collector 4, the take-up station 10C comprises an additional structure which comprises a device 14 in the form of a comb also. This device 14 in the form of a comb is complementary to the comb of the collector 4, device 14 being mobile transversally, actuated by appropriate means, in order to empty each cell of the collector 4. This device 14 is mobile transversally over a length which corresponds at least to the transversal dimension of the products 1.

In the preceding embodiment, shown in FIG. 9, the collector 4 can start its reverse movement as soon as the pallet 13 is placed into position. In the embodiment shown in FIG. 13, the collector 4 cannot start its reverse movement until after it has been unloaded of all of its products 1 by the device 14 which has transferred said products 1 on take-up station 10C; as soon as it is unloaded, the collector 4 can be set into movement in order to return to its point of departure and the device 14 also returns to its point of departure, i.e. the other side of the supply conveyor 3 in relation to the side of the slider bed 11.

Figure 14:
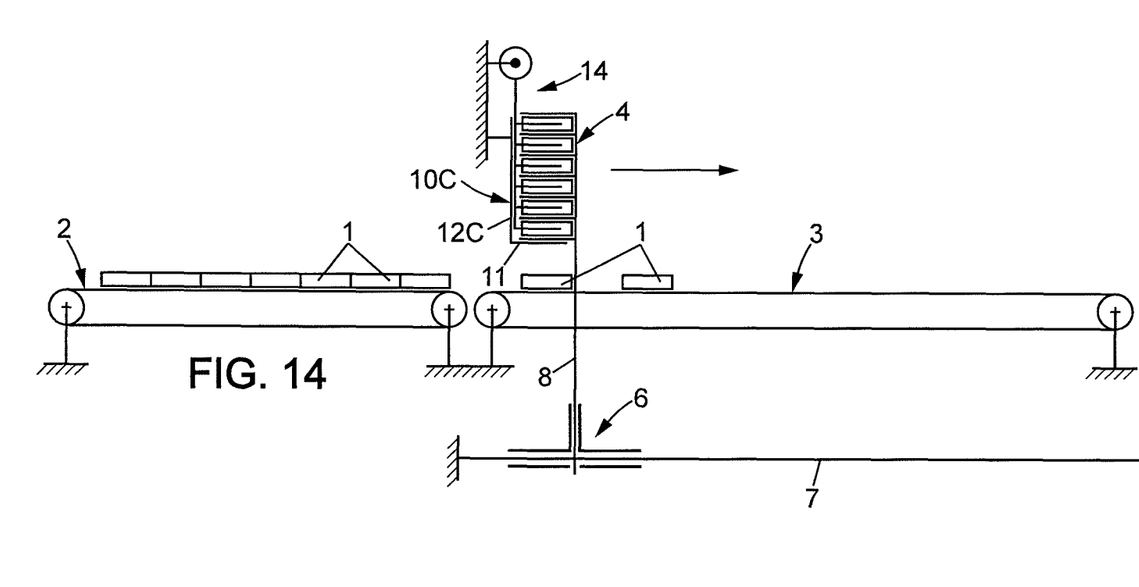
FIG. 14 shows the collector in FIG. 12 on the take-up station, when the collector is unloaded of its products by a device of the comb type which sweeps the cells of said collector in order to transfer the products on the take-up station which, as shown in FIG. 13, is arranged outside of the passage of said collector.

FIG. 14 shows the collector 4 at the end of travel of collecting of products 1, with all of its cells filled with these products 1, collector 4 being positioned on take-up station 10C, on the side of the slider bed 11. In this position the device 14 is set into movement by appropriate means in order to carry out a transversal movement of unloading and of transferring of the products 1 towards the slider bed 11 of this take-up station 10C. The different products 1 are pushed by the teeth of the device 14, teeth being located in the middle portion of the cells 5 of the collector 4.

In this last embodiment, the method consists, after the collecting of products and the vertical displacement of the collector 4, in order to not obstruct the passing of the products which are arranged on the supply conveyor 3, in supplying said collector 4 between the take-up station 10C arranged laterally and a device 14 for emptying in the form of a comb of which the form is complementary to that of said collector 4, in providing said device 14 with a transversal movement, in relation to the longitudinal movement of the collector 4, and during the stoppage of the latter, in transferring the products collected towards said take-up station 10C and in returning said collector to its point of departure.

What is claimed is:

1. Method for grouping stackable products, comprising at least one of cases and small plates, so that the products are taken up for packaging, the products arriving in line on a first feed conveyor which has an accumulation function and a distribution function of said products, the distribution function being carried out sequentially to feed a supply conveyor, the method comprising:
collecting the products being conveyed on said supply conveyor by a collector comprising a comb with superimposed cells having openings, form and dimensions of said superimposed cells being adapted to a section of the products to be collected from the supply conveyor, the collector being arranged transversally in relation to a longitudinal direction of advancing of said products on said supply conveyor to be movable along at least one side of the supply conveyor, and is shifted vertically with respect to the supply conveyor and horizontally in a direction opposite an advancement direction of the supply conveyor towards the products to collect a next product disposed upstream from the collector;
depositing the products, which have been collected, on a take-up station which is located above a level of said supply conveyor;
providing said collector with a cyclical loop movement, which comprises a collecting phase, a depositing phase, and a return phase,
wherein said collecting phase is divided into a vertical rising movement to align the opening of one of the superimposed cells with the next product, and a longitudinal movement for advancing opposite to the direction of advancement of said supply conveyor of products to go back up a queue of the products arranged on said supply conveyor, and said return phase is divided into a longitudinal movement in the direction of advancement of said supply conveyor of products and a vertical descending movement;
triggering the collecting phase of the products based on at least on one of the position of said products on said supply conveyor in relation to said collector and a speed of said supply conveyor;
organizing the depositing phase by emptying all of the products forming a batch, which is located in the collector, by transferring the batch onto a receiving slider bed, on which said batch takes the form of a stack of products.

2. Method for grouping stackable products according to claim 1, further comprising:
furnishing the supply conveyor with the products and stopping the supply conveyor for at least a collecting time for all or a portion of the products that the supply conveyor is carrying.

3. Method for grouping stackable products according to claim 1, further comprising:
collecting the products on the fly on the supply conveyor which is continuously over-supplied by the feed conveyor and which advances continuously with the products to be collected.

4. Method for grouping stackable products according to claim 1, further comprising:
detecting a presence of a product upstream of the collector, stopping the supply conveyor as soon as the detected product has been collected by said collector,
displacing the collector vertically and then longitudinally in order to carry out the collecting of the next product,
after the collecting of a last product arranged upstream of said supply conveyor, bringing said collector downstream of said supply conveyor,
obstructing a travel of the collector by the take-up station which directly takes up the collected products, which are stacked on a slider bed of said take-up station and retained by a backrest associated to said slider bed, and simultaneously initiating a return movement of said collector, and
starting up a movement of the supply conveyor to load the supply conveyor again with the products to be collected.

5. Method for grouping stackable products according to claim 1, further comprising:
collecting the products on the fly on a supply conveyor which advances continuously with the products,
after the last collecting, vertically and then horizontally displacing the collector in order to supply its collecting on the take-up station,
supplying an obstruction on the return path of said collector in association with said take-up station and is setting said collector into return movement in the direction of advancement of the supply conveyor, movement provoking an automatic emptying of said collector, and
providing said collector with a return movement at a speed that is greater than that of said supply conveyor in order to go back up the queue of products to be collected arranged on the latter and return to its departure position of collecting said products.

6. Method for grouping stackable products according to claim 1, wherein, after the collecting of products and the vertical displacement of the collector, in order to not obstruct the passing of the products which are arranged on the supply conveyor, the method further comprises:
supplying said collector between a take-up station arranged laterally and a structure for emptying in the form of a comb complementary to said collector,
providing said structure for emptying with a transversal movement, in relation to the longitudinal movement of the collector, and
during the stoppage of the latter, transferring the collected products towards said take-up station and putting said collector back in its point of departure.

7. Installation for grouping stackable products for the implementation of the method according to claim 1, the installation comprising:
a feed conveyor acting as an accumulation and distribution conveyor of the products to be grouped together,
a supply conveyor which is furnished by said feed conveyor, supply conveyor being capable of advancing at a speed which is greater than that of said feed conveyor in order to generate, automatically, a space between the products,
a collector, comprising a comb, arranged transversally in relation to said supply conveyor and shifted vertically and horizontally to collect the next product which is disposed upstream of the collector, the collector comprising superimposed cells comprising openings and arranged to collect the products one after the other, a take-up station arranged at a level which is greater than that of the plane of the supply conveyor of the products, and, associated to the take-up station, means of unloading of said collector in order to deposit said products collected on the slider bed of said take-up station, in the form of a stack.

8. Installation for grouping stackable products according to claim 7, wherein the products are arranged crosswise on a single supply conveyor, and the installation further comprises:

a collector which is comprised of two combs arranged on either side of the supply conveyor, in order to collect the products on their ends, said products being transported by said supply conveyor on their central middle portion.

9. Installation for grouping stackable products according to claim 8, further comprising:

a take-up station comprising a slider bed arranged above the level of products located on said supply conveyor, on the return path of said collector, the slider bed arranged above and in the alignment of said supply conveyor of products and of means of unloading of said collector comprised of a backrest associated to said slider bed, backrest obstructing the passing of the collected products, on the return path of the collector, products being deposited on their central portion, on said slider bed, in the form of a stack of products.

10. Installation for grouping stackable products according to claim 8, wherein said combs are carried by arms which are spaced at a distance D which is greater than the dimension of the products, in their transversal direction, such as they are carried, said products, by said supply conveyor.

11. Installation for grouping stackable products according to claim 10, further comprising:

a take-up station which is arranged on the upstream portion of the supply conveyor, in order to receive the collected products before the return movement of said collector towards the point of departure.

12. Installation for grouping stackable products according to claim 11, wherein the take-up station comprises a slider bed arranged above the supply conveyor and means of unloading comprised of a moveable pallet which constitutes an obstruction for the products on the return path of said collector, pallet being mobile in a vertical plan between an inactive position which allows for the passing of the products during the movement of going back up the queue, until the take-up station, and an active position wherein said pallet is positioned between the two combs, across from the central portion of the products in order to unload said collector.

13. Installation for grouping stackable products according to claim 8, further comprising:

a take-up station which is arranged in the upstream portion of the supply conveyor, shifted laterally in relation to the path of the collector and the take-up station interacts with means of unloading of said collector which are comprised of a device in the form of a comb, complementary to the combs of said collector, device being capable of a transversal movement in relation to the movement of said collector in order to transfer the products arranged in the cells of said collector on the slider bed of said take-up station which is arranged laterally, making possible a return to the point of departure of the collector as soon as the products carried by the latter are ejected.

14. Installation for grouping stackable products for the implementation of the method according to claim 1, the installation comprising:

a take-up station of the products which is located on the return path of the collector and the means of unloading of said collector are comprised of a backrest, backrest obstructing the travel of the products during said return movement of said collector, the products being deposited automatically on the slider bed of said take-up station, in the form of a stack of products.

15. Installation for grouping stackable products for the implementation of the method according to claim 14, further comprising:

a collector which is constituted of a comb which circulates between two supply conveyors of products, collector collecting the products in their central middle portion and depositing these products at the take-up station which is constituted of two slider beds arranged each respectively above said supply conveyors and the products rest on each slider bed, on their ends.

16. Installation for grouping stackable products according to claim 14, further comprising:

means of unloading of the collector, means being arranged on the take-up station, by means of a pair of backrests which obstruct the passing of the products during the return movement of said collector, the collector passing between the two backrests and between the two slider beds, leaving the products on said take-up station, in the form of a stack able to be picked up by a device comprising a robot.

* * * * *